US010828967B2

(12) United States Patent
Nakado et al.

(10) Patent No.: US 10,828,967 B2
(45) Date of Patent: Nov. 10, 2020

(54) AIR CONDITIONING DEVICE FOR VEHICLE

(71) Applicant: MITSUBISHI HEAVY INDUSTRIES THERMAL SYSTEMS, LTD., Tokyo (JP)

(72) Inventors: Koji Nakado, Aichi (JP); Atsushi Suzuki, Aichi (JP); Yasuhiro Watanabe, Aichi (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 225 days.

(21) Appl. No.: 15/781,847

(22) PCT Filed: Oct. 4, 2016

(86) PCT No.: PCT/JP2016/079548
§ 371 (c)(1),
(2) Date: Jun. 6, 2018

(87) PCT Pub. No.: WO2017/098792
PCT Pub. Date: Jun. 15, 2017

(65) Prior Publication Data
US 2018/0370337 A1 Dec. 27, 2018

(30) Foreign Application Priority Data
Dec. 8, 2015 (JP) ................. 2015-239498

(51) Int. Cl.
*B01D 46/10* (2006.01)
*B01D 46/42* (2006.01)
(Continued)

(52) U.S. Cl.
CPC ....... *B60H 3/0608* (2013.01); *B01D 46/0002* (2013.01); *B01D 46/10* (2013.01);
(Continued)

(58) Field of Classification Search
CPC ...... B01D 46/10; B01D 46/521; B01D 46/42; B01D 46/0002; B01D 2265/06;
(Continued)

(56) References Cited

U.S. PATENT DOCUMENTS 4,233,044 A * 11/1980 Allan ................. B01D 46/0005
55/355
4,511,380 A * 4/1985 Fetter ................ B01D 46/0005
55/355
(Continued)

FOREIGN PATENT DOCUMENTS

CN 101284490 B 6/2010
CN 104602929 A 5/2015
(Continued)

OTHER PUBLICATIONS

Japanese Notice of Reasons for Refusal dated Oct. 15, 2019, for corresponding Japanese Patent Application No. 2015-239498, with English translation.
(Continued)

*Primary Examiner* — Minh Chau T Pham
(74) *Attorney, Agent, or Firm* — Birch, Stewart, Kolasch & Birch, LLP

(57) ABSTRACT

An air conditioning device for a vehicle (1) includes: a housing (2) having an opening (2M); a blower (4) having a fan (9) accommodated within the housing and rotating about a rotation axis parallel to a first axis; a filter section (5) which is disposed between a gas inlet (7) and the opening and through which gas taken in from the gas inlet and flowing into the opening passes; and a support member (6) disposed between the blower and the filter section so as to be located at least partially at the opening, and supporting the filter section. The support member has a rib portion (61) extending in a longitudinal direction in a predetermined plane orthogonal to the first axis, and a sticking-out portion (62)
(Continued)

sticking out from the rib portion in a transverse direction in the predetermined plane orthogonal to the longitudinal direction.

18 Claims, 9 Drawing Sheets

(51) Int. Cl.
  *B60H 3/06* (2006.01)
  *B01D 46/00* (2006.01)
  *B01D 46/52* (2006.01)
  *B60H 1/00* (2006.01)

(52) U.S. Cl.
  CPC ........... *B01D 46/42* (2013.01); *B01D 46/521* (2013.01); *B60H 1/00678* (2013.01); *B60H 1/00849* (2013.01); *B01D 2265/06* (2013.01); *B01D 2273/30* (2013.01); *B01D 2279/50* (2013.01); *B60H 2001/006* (2013.01); *B60H 2003/065* (2013.01)

(58) Field of Classification Search
  CPC ............ B01D 2279/50; B01D 2273/30; B60H 3/0608; B60H 1/00849; B60H 1/00678; B60H 2003/065; B60H 2001/006
  USPC ...... 55/355, 466, 490.1, 483, 484, 494, 502, 55/511, DIG. 31, DIG. 9; 96/134, 139
  See application file for complete search history.

(56) References Cited

U.S. PATENT DOCUMENTS

| | | | |
|---|---|---|---|
| 5,876,277 A * | 3/1999 | Uemura | ............. B60H 1/00849 454/139 |
| 8,235,649 B2 | 8/2012 | Kang et al. | |
| 9,676,245 B2 | 6/2017 | Clemence et al. | |
| 2008/0253879 A1 | 10/2008 | Kang et al. | |
| 2013/0011240 A1 | 1/2013 | Kuhnert | |
| 2014/0065942 A1 | 3/2014 | Clemence et al. | |
| 2015/0128804 A1 * | 5/2015 | Salpietra | ............ B01D 53/0407 96/139 |
| 2018/0318747 A1 * | 11/2018 | Poon | ...................... B01D 46/10 |

FOREIGN PATENT DOCUMENTS

| | | |
|---|---|---|
| JP | 6-18018 U | 3/1994 |
| JP | 8-215528 A | 8/1996 |
| JP | 2000-264056 A | 9/2000 |
| JP | 2004-251211 A | 9/2004 |
| JP | 2006-256427 A | 9/2006 |
| JP | 2007-276750 A | 10/2007 |
| JP | 2008-230569 A | 10/2008 |
| JP | 2012-158218 A | 8/2012 |
| JP | 2013-535374 A | 9/2013 |
| JP | 2014-231296 A | 12/2014 |
| JP | 5687081 B2 | 3/2015 |
| KR | 10-2007-0060564 A | 6/2007 |

OTHER PUBLICATIONS

International Search Report and Written Opinion of the International Searching Authority (Forms PCT/ISA/210, PCT/ISA/220, and PCT/ISA/237) for International Application No. PCT/JP2016/079548, dated Dec. 13, 2016, with English translations.

Chinese Office Acton and Search Report dated Jul. 15, 2020 for Application No. 201680071721.9, along with an English translation of the Office Action.

* cited by examiner

AIR CONDITIONING DEVICE FOR VEHICLE

TECHNICAL FIELD

The present invention relates to an air conditioning device for a vehicle.

BACKGROUND ART

An air conditioning device for a vehicle is provided in a vehicle, as a heating, ventilating, and air conditioning (HVAC) unit. The air conditioning device for a vehicle includes a filter section disposed upstream of a blower and improves quality of air in the vehicle by collecting foreign substances and the like with the filter section. When air flows due to the blower being activated, the filter section may be deformed by force of the air so as to warp toward the blower. Thus, a support member is provided that suppresses the warping of the filter section, as disclosed in Patent Document 1.

CITATION LIST

Patent Document

Patent Document 1: JP 08-215528 A

SUMMARY OF INVENTION

Technical Problems

In a case where air flows around the support member, NZ sound may be amplified, causing an unpleasant noise, depending on the structure of the support member. NZ sound refers to narrow-band noise generated in correlation with the rotational speed (N) of the blower and the number (Z) of fans, and is considered to be generated by an unbalanced flow rate or pressure of the air flowing into the blower.

An object of the present invention is to provide an air conditioning device for a vehicle capable of reducing noise generation.

Solution to Problems

An embodiment of the present invention provides an air conditioning device for a vehicle, including: a housing including an opening; a blower including a fan accommodated in the housing, the fan rotating about a rotation axis parallel to a first axis; a filter section disposed between a gas inlet and the opening, gas taken in from the gas inlet and flowing into the opening passing through the filer section; and a support member disposed between the blower and the filter section located at least partially at the opening, the support member supporting the filter section. The support member includes a rib portion extending in a longitudinal direction in a predetermined plane orthogonal to the first axis and a sticking-out portion sticking out from the rib portion in a transverse direction in the predetermined plane and orthogonal to the longitudinal direction.

According to an embodiment of the present invention, even in a case where force of gas flowing from the gas inlet through the filter section to the opening causes the filter section to warp, the support member located at least partially at the opening suppresses warping of the filter section. The inventors have found that even in a case where air flows around the support member, the sticking-out portion of the support member can reduce noise generation. According to the finding of the inventors, the sticking-out portion provided disturbs the flow of gas around the support member. As a result, it is assumed that generation of a gas stagnation portion is suppressed, an unbalanced flow rate or pressure of gas flowing into the blower is prevented, and generation of noise, such as NZ sound, is reduced. Furthermore, according to an embodiment of the present invention, the rib portion provided maintains rigidity of the support member extending in the longitudinal direction.

In an embodiment of the present invention, the support member is preferably affixed to the housing so as to be located at the center of the opening.

The support member located at the center of the opening effectively suppresses warping of the filter section.

In an embodiment of the present invention, the air conditioning device for a vehicle preferably includes a damper capable of rotating about a rotation axis parallel to a second axis in the predetermined plane, the damper opening and closing the gas inlet; the rotation axis of the fan is preferably orthogonal to the rotation axis of the damper; and the gas inlet is preferably arranged away from the rotation axis of the damper in a direction parallel to a third axis in the predetermined plane orthogonal to the second axis.

A vehicle is provided with a gas inlet taking in outside air and a gas inlet taking in inside air, and the damper rotating about the rotation axis and switching intake of the outside air and intake of the inside air. In a case where the gas inlet is disposed away from the rotation axis of the damper in the direction parallel to the third axis, at least part of gas flowing from the gas inlet toward the opening collides with the support member diagonally. The inventors have found that in consideration of such positional relationship between the gas inlet and the support member, providing the sticking-out portion in the support member can effectively reduce noise generation.

In the present invention, the longitudinal direction is preferably parallel to the second axis.

The inventors have found that with the longitudinal direction of the support member being parallel to the rotation axis of the damper, the sticking-out portion sticking out from the rib in the direction parallel to the third axis can effectively reduce noise generation.

In an embodiment of the present invention, the sticking-out portion preferably sticks out from the rib portion toward both sides in the transverse direction.

The inventors have found that the sticking-out portion disposed on both sides of the rib can reduce noise generation more effectively.

In an embodiment of the present invention, the sticking-out portion preferably includes first portions and second portions, a sticking-out amount of the first portions from the rib portion being a first dimension, a sticking-out amount of the second portions from the rib portion being a second dimension different from the first dimension. The first portions and the second portions are preferably disposed alternately in the longitudinal direction.

The first portions and the second portions are disposed alternately in the longitudinal direction of the support member, so that recesses and projections are provided at ends of the sticking-out portion. This configuration can effectively reduce noise generation. It is assumed that noise generation can be effectively reduced because the recesses and projections provided at the ends of the sticking-out portion further disturb the flow of gas.

In an embodiment of the present invention, the sticking-out portion preferably includes third portions and fourth portions, a dimension of the third portions in a direction parallel to the first axis being a third dimension, a dimension of the fourth portions in the direction parallel to the first axis being a fourth dimension different from the third dimension. The third portions and the fourth portions are preferably disposed alternately in the longitudinal direction.

The third portions and the fourth portions are disposed alternately in the longitudinal direction of the support member, so that recesses and projections are provided on the upper surface or lower surface of the sticking-out portion. This configuration can also reduce noise generation effectively. It is also assumed that noise generation can be effectively reduced because the recesses and projections provided on the upper surface or lower surface of the sticking-out portion further disturb the flow of gas.

Advantageous Effects of Invention

The present invention provides an air conditioning device for a vehicle capable of reducing noise generation.

DESCRIPTION OF EMBODIMENTS

Embodiments according to the present invention will be described below with reference to the accompanying drawings. However, the present invention is not limited to these embodiments. The constituent elements of the embodiments described below can be combined with each other as desired. Furthermore, some constituent elements may not be used in some cases.

In the following description, an XYZ Cartesian coordinate system is set, and positional relationships of the constituents are stated while referencing this XYZ Cartesian coordinate system. The Z axis (first axis), Y axis (second axis), and X axis (third axis) are orthogonal to each other. The XY plane (predetermined plane) includes the X axis and Y axis and is orthogonal to the Z axis. In the following description, the +Z direction is referred to as "above", and the −Z direction is referred to as "below", where appropriate.

First Embodiment

Figure 1:
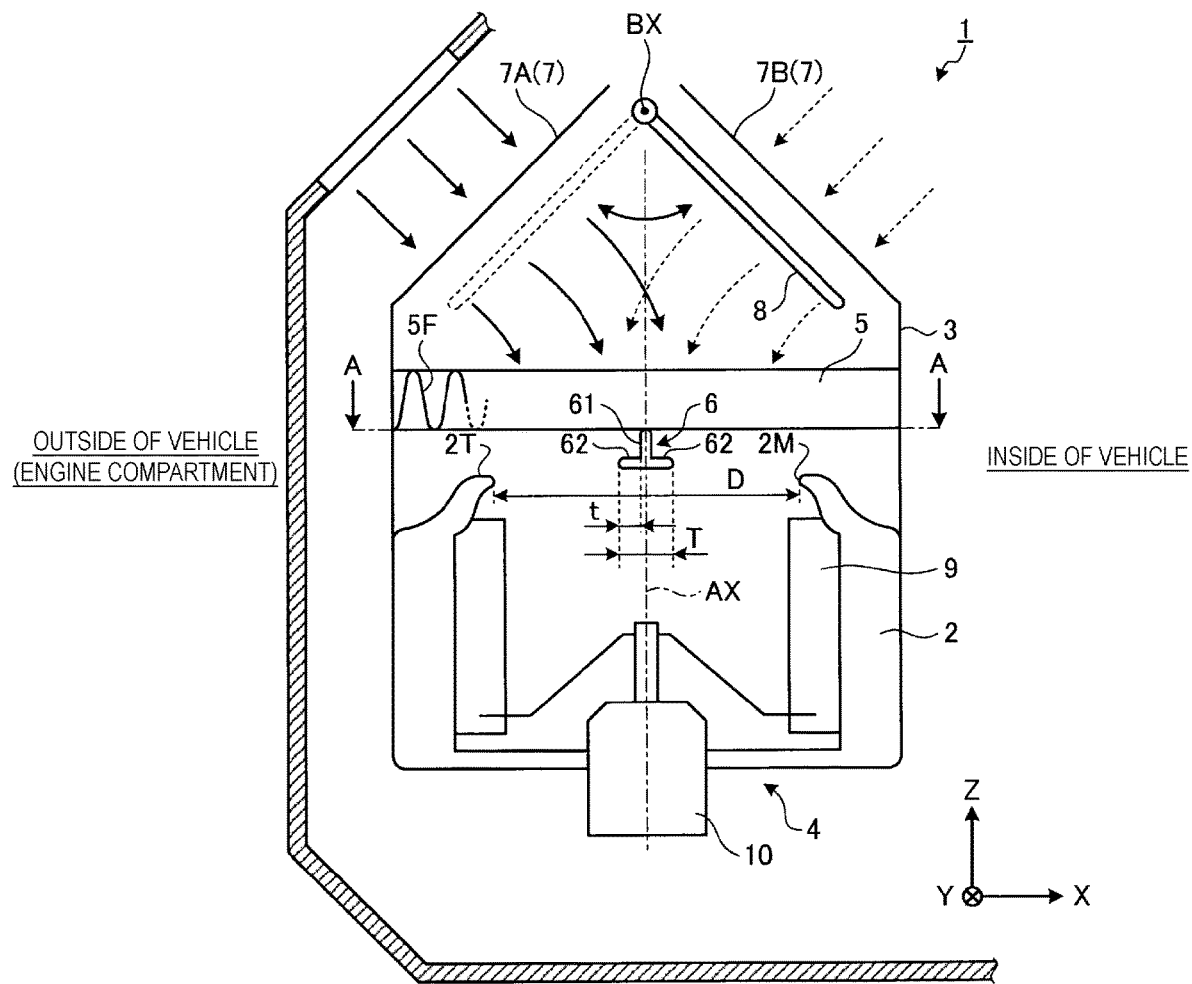
FIG. 1 is a cross-sectional view schematically illustrating an example of an air conditioning device for a vehicle according to a first embodiment.
Figure 2:
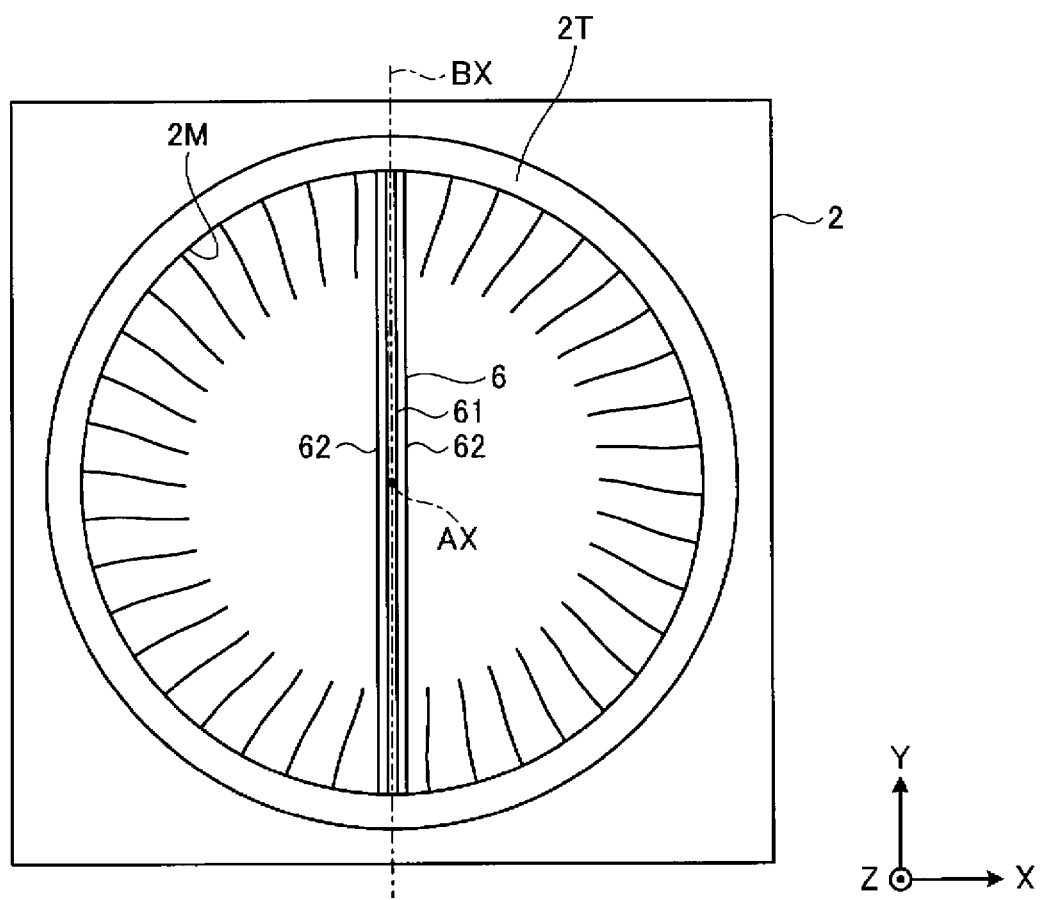
FIG. 2 is a top view of a housing according to the first embodiment, taken along line A-A in FIG. 1.

A first embodiment of the present invention will be described below. FIG. 1 is a cross-sectional view schematically illustrating an example of an air conditioning device for a vehicle 1 according to the present embodiment. FIG. 2 is a top view of a housing 2 according to the present embodiment, taken along line A-A in FIG. 1.

As illustrated in FIGS. 1 and 2, the air conditioning device for a vehicle 1 includes the housing 2, an inside/outside air switching box 3 disposed above the housing 2, a blower 4 at least partially accommodated in the housing 2, a filter section 5 accommodated in the inside/outside air switching box 3, and a support member 6 supporting the filter section 5.

The housing 2 includes an opening 2M from which air, being gas, flows in and an upper surface 2T arranged in the periphery of the opening 2M. The upper surface 2T faces the filter section 5. The upper surface 2T includes a curved surface, and the opening 2M has a bell-mouth shape.

The inside/outside air switching box 3 includes a gas inlet 7 taking in air and a damper 8 opening and closing the gas inlet 7. The gas inlet 7 includes an outside air inlet 7A taking in outside air being air outside the vehicle and an inside air inlet 7B taking in inside air being air inside the vehicle. The damper 8 is accommodated in the inside/outside air switching box 3, and opens either one of the outside air inlet 7A and the inside air inlet 7B and closes the other to switch intake of outside air and intake of inside air.

The damper 8 can rotate about a rotation axis BX parallel to the Y axis. The damper 8 rotates about the rotation axis BX to open either one of the outside air inlet 7A and the inside air inlet 7B and close the other.

The inside of the inside/outside air switching box 3 and the inside of the housing 2 are in connection with each other through the opening 2M. Air taken in from the gas inlet 7 flows into the housing 2 through the opening 2M.

The blower 4 includes a fan 9 accommodated in the housing 2 and a motor 10 generating motive power for rotating the fan 9. The fan 9 is a sirocco fan and rotates about a rotation axis AX parallel to the Z axis by operation of the motor 10. When the blower 4 is activated, the air taken into the inside/outside air switching box 3 from the gas inlet 7 flows into the housing 2 through the filter section 5 and the opening 2M.

The filter section 5 is disposed between the gas inlet 7 and the opening 2M. The air taken in from the gas inlet 7 passes through the filter section 5 and flows into the opening 2M. The filter section 5 includes a filter 5F composed of, for example, filter paper, and collects foreign substances and the like in the air taken in from the gas inlet 7.

The filter section 5 is disposed above the housing 2. The lower surface of the filter section 5 is away from the upper surface 2T of the housing 2. This configuration suppresses an increase in ventilation resistance at the circumferential edge of the filter section 5. The upper surface of the filter section 5 is arranged at a height so as not to come into contact with the damper 8.

The support member 6 is disposed between the blower 4 and the filter section 5 and supports the lower surface of the filter section 5. Force of gas flowing from the gas inlet 7 toward the opening 2M may cause the filter section 5 to warp downward. The support member 6 supports the filter section 5 so that the filter section 5 does not warp downward.

As illustrated in FIG. 2, the support member 6 is a rod-like member and extends in a predetermined direction in the XY plane. In the following description, the extending direction of the support member 6 is referred to as "longitudinal direction", and a direction in the XY plane orthogonal to the longitudinal direction is referred to as "transverse direction", where appropriate.

In the present embodiment, the longitudinal direction of the support member 6 is parallel to the Y axis, and the transverse direction of the support member 6 is parallel to the X axis.

The support member 6 is affixed to the housing 2. In the present embodiment, only one support member 6 is provided across the opening 2M. The support member 6 is located at least partially at the opening 2M.

In the XY plane, the opening 2M is circular, and the center of the opening 2M is orthogonal to the rotation axis AX of the fan 9. The center of the opening 2M is located coinciding with the rotation axis AX in the XY plane. A first end and a second end of the support member 6 are affixed to the housing 2 so that the central portion of the support member 6 in the longitudinal direction is located at the center of the opening 2M.

The rotation axis AX of the fan 9 is orthogonal to the rotation axis BX of the damper 8. In the XY plane, the rotation axis AX and the rotation axis BX overlap each other. The support member 6 is disposed directly below the rotation axis BX of the damper 8.

The support member 6 includes a rib portion 61 extending in the longitudinal direction and a sticking-out portion 62 sticking out from the rib portion 61 in the transverse direction. As illustrated in FIG. 1, in a cross section orthogonal to the longitudinal direction of the support member 6, the rib portion 61 has a cross section having a rectangular shape longer in the Z-axis direction, and the sticking-out portion 62 has a cross section having a rectangular shape longer in the X-axis direction.

In the present embodiment, the sticking-out portion 62 sticks out from the lower end (end on the −Z side) of the rib portion 61 in the transverse direction. In the present embodiment, the sticking-out portion 62 sticks out from the rib portion 61 toward both sides in the transverse direction. The sticking-out amount of the sticking-out portion 62 on the +X side is equal to the sticking-out amount of the sticking-out portion 62 on the −X side.

In FIG. 1, t indicates the sticking-out amount of the sticking-out portion 62 from the rib portion 61, and D indicates a dimension of the opening 2M. The shape of the support member 6 is determined so that Relationship (1) below is satisfied.

$$1\% \leq t/D \leq 5\% \qquad (1)$$

Note that t/D is preferably 2.5%. The sticking-out amount t refers to the distance in the transverse direction between the leading end of the sticking-out portion 62 in the transverse direction and the interface portion between the sticking-out portion 62 and the rib portion 61. The dimension D of the opening 2M refers to the diameter of the opening 2M in the XY plane.

Furthermore, T indicates a dimension of the sticking-out portion 62 in the transverse direction of the support member 6, and D indicates the dimension of the opening 2M. The shape of the support member 6 is determined so that Relationship (2) below is satisfied.

$$5\% \leq T/D \leq 15\% \qquad (2)$$

Note that T/D is preferably 7%. The dimension T of the sticking-out portion 62 refers to the distance between a first leading end and a second leading end of the sticking-out portion 62 in the transverse direction.

As illustrated in FIG. 1, the gas inlet 7 is arranged away from the rotation axis BX of the damper 8 in the X-axis direction. The outside air inlet 7A is arranged on the −X side of the rotation axis BX, and the inside air inlet 7B is arranged on the +X side of the rotation axis BX. In the XY plane, the gas inlet 7 and the support member 6 do not overlap each other, and the support member 6 is arranged in a position that is not directly below the gas inlet 7. The air taken in from the gas inlet 7 collides with the support member 6 diagonally.

Figure 3:
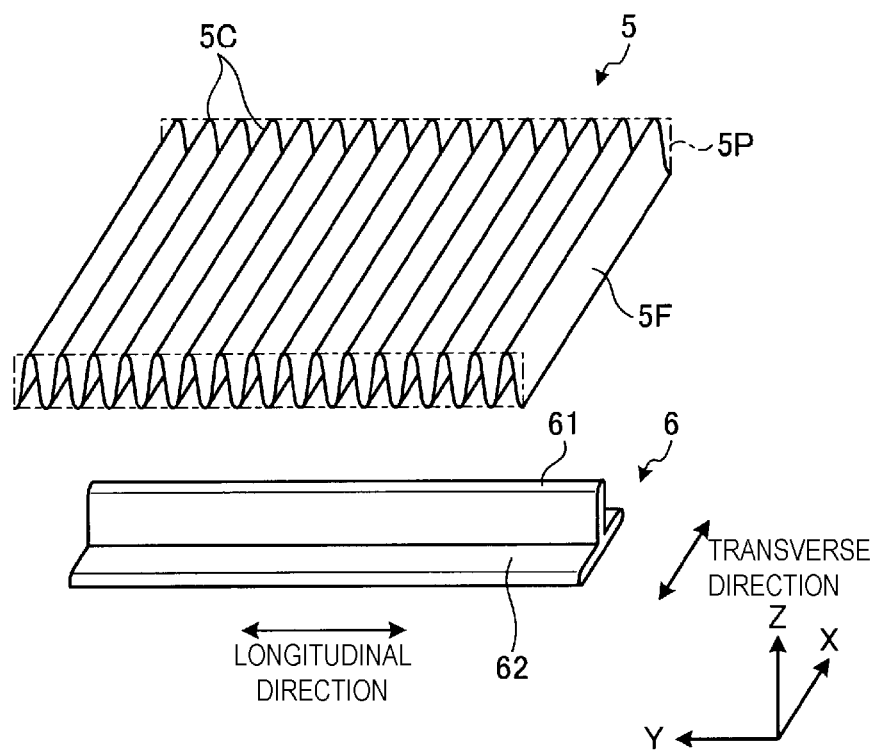
FIG. 3 is a perspective view illustrating an example of a support member and a filter section according to the first embodiment.

FIG. 3 is a perspective view illustrating an example of a support member 6 and filter section 5 according to the present embodiment. The filter section 5 includes the filter 5F composed of filter paper and packing 5P composed of elastic material, such as urethane foam and rubber material. The filter 5F is formed by alternately folding the filter paper a plurality of times and includes a plurality of bent portions 5C. The ridges of the bent portions 5C are orthogonal to the longitudinal direction of the support member 6. The packing 5P is disposed on sides of the bent portions 5C of the filter 5F. The positional relationship between the filter section 5 and the support member 6 is determined so that the ridges of the bent portions 5C are orthogonal to the longitudinal direction of the support member 6, resulting in effective suppression of warping of the filter section 5.

Next, an example of operation of the air conditioning device for a vehicle 1 according to the present embodiment will be described. When the motor 10 is activated to rotate the fan 9, air flows into the inside/outside air switching box 3 through the gas inlet 7. The air flowing in passes through the filter section 5 and then flows into the housing 2 through the opening 2M.

The gas inlet 7 is located above the opening 2M. The air from the gas inlet 7 flows in the −Z direction and into the opening 2M. Part of air taken in from the gas inlet 7 and passing through the filter section 5 collides with the support member 6 diagonally.

Figure 4:
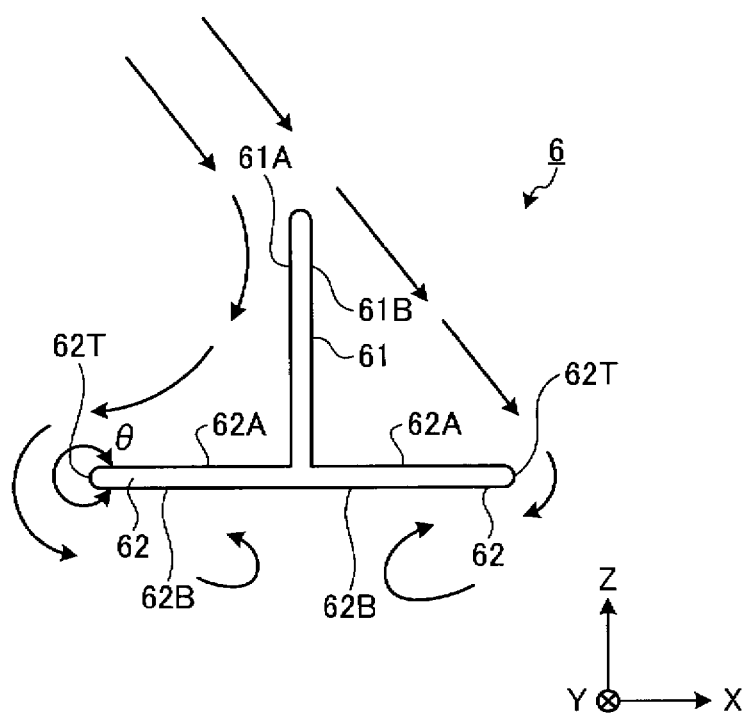
FIG. 4 is a cross-sectional view illustrating an example of a support member according to the first embodiment.

FIG. 4 is an enlarged cross-sectional view of the support member 6 according to the present embodiment. The rib portion 61 includes a first side surface 61A facing in the −X direction and a second side surface 61B facing in the +X direction. The sticking-out portion 62 includes an upper surface 62A facing in the +Z direction and a lower surface 62B facing in the −Z direction. The first side surface 61A and the second side surface 61B are substantially parallel to each other, and the upper surface 62A and the lower surface 62B are substantially parallel to each other.

The air diagonally collides with the rib portion 61 having a cross section longer in the Z-axis direction. In a case where air is taken in from the outside air inlet 7A, the air collides with the rib portion 61 from the −X side. In a case where air is taken in from the inside air inlet 7B, the air collides with the rib portion 61 from the +X side. FIG. 4 schematically illustrates the flow of air taken in from the outside air inlet 7A with the damper 8 closing the inside air inlet 7B.

The air from the outside air inlet 7A collides with the first side surface 61A, then flows along the upper surface 62A, turns at a leading end 62T of the sticking-out portion 62 on the −X side, and flows into a space where the lower surface 62B faces. An angle θ formed between the upper surface 62A and the lower surface 62B is approximately 360°, and the air colliding with the first side surface 61A generates a swirl on the lower surface 62B side.

Air not colliding with the first side surface 61A turns at a leading end 62T of the sticking-out portion 62 on the +X side of the rib portion 61 and flows into the space where the lower surface 62B faces. The air not colliding with the first side surface 61A also generates a swirl on the lower surface 62B side.

That is, by providing the sticking-out portion 62, swirls are generated on the lower surface 62B side of the sticking-out portion 62, resulting in a disturbed air flow. The disturbed air flow suppresses generation of a stagnation portion in which the flow rate decreases. This operation prevents an unbalanced flow rate or pressure of air flowing into the blower 4 through the opening 2M and enables air having a uniform flow rate or pressure to flow into the blower 4.

In a case where air having an unbalanced (non-uniform) flow rate or pressure flows into the blower 4 through the opening 2M, it is assumed that NZ sound is amplified, causing significant noise. NZ sound refers to narrow-band noise generated in correlation with the rotational speed (N) of the blower 4 and the number (Z) of fans and is generated when a flow into the blower 4 causes periodic pressure fluctuation. It is considered that NZ sound is generated by air with an unbalanced flow rate or pressure flowing into the blower 4. The inventors have found that in a case where the sticking-out portion 62 is provided to disturb the flow of air flowing into the blower 4, generation of noise, such as NZ sound, can be reduced.

Figure 5:
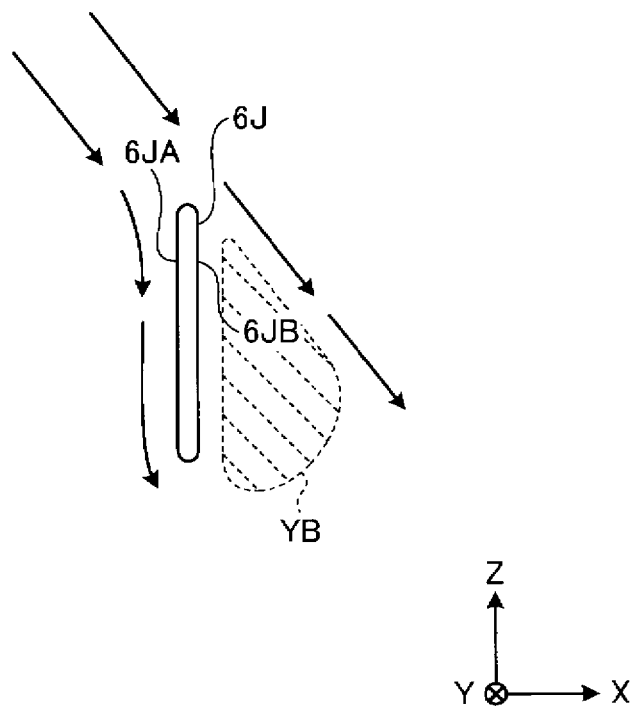
FIG. 5 is a cross-sectional view illustrating a of a support member according to Comparative Example.

FIG. 5 illustrates a support member 6J according to Comparative Example. The support member 6J has a cross-sectional shape extending in the Z-axis direction and is not provided with a sticking-out portion. The support member 6J includes a first side surface 6JA facing in the −X direction and a second side surface 6JB facing in the +X direction.

Air from the outside air inlet 7A collides with the first side surface 6JA, then flows along the first side surface 6JA, and reaches the lower end of the support member 6J. Air not colliding with the first side surface 6JA flows without colliding with the second side surface 6JB. As illustrated in FIG. 5, this operation generates a stagnation portion YB in which the flow rate of air is slow. In a case where the stagnation portion YB is generated, it is assumed that air having an unbalanced (non-uniform) flow rate or pressure flows into the blower 4 through the opening 2M, and NZ sound is amplified, causing unpleasant noise to be generated.

The inventors have obtained an experimental result in which use of the support member 6 according to the present embodiment can effectively reduce noise generation in comparison with the case using the support member 6J according to Comparative Example illustrated in FIG. 5.

As described above, according to the present embodiment, even in the case where air flowing around the support member 6 flows into the blower 4 after the blower 4 is activated, the support member 6 including the sticking-out portion 62 can reduce amplification of NZ sound and reduce generation of unpleasant noise. Furthermore, the rib portion 61 provided enhances rigidity of the support member 6 extending in the longitudinal direction. Thus, even in the case where force of air flowing from the gas inlet 7 through the filter section 5 into the opening 2M causes the filter section 5 to warp, the support member 6 can effectively suppress warping of the filter section 5.

In the present embodiment, the support member 6 is provided across the opening 2M to effectively suppress warping of the filter section 5. Even in the case where force of gas flowing toward the opening 2M causes the filter section 5 to warp, the support member 6 located at least partially at the opening 2M can effectively suppress the warping of the filter section 5. In the present embodiment, the support member 6 is provided across the opening 2M. Thus, even in a case where air collides with the support member 6 directly, the improved structure of the support member 6 can suppress warping of the filter section 5 and reduce noise generation.

In the present embodiment, the support member 6 is located at least partially at the center of the opening 2M. The filter section 5 warps in the greatest amount in the vicinity of the center of the opening 2M. Thus, the support member 6 located at the center of the opening 2M effectively suppresses warping of the filter section 5.

A vehicle is typically provided with the outside air inlet 7A taking in outside air and the inside air inlet 7B taking in inside air, and the damper 8 rotating about the rotation axis BX and switching intake of the outside air and intake of the inside air. The gas inlet 7 (outside air inlet 7A and inside air inlet 7B) is often disposed away from the rotation axis BX of the damper 8 in the X-axis direction, so that air flowing from the gas inlet 7 toward the opening 2M collides with the support member 6 diagonally. The inventors have found that in consideration of such positional relationship between the gas inlet 7 and the support member 6, providing the sticking-out portion 62 in support member 6 can effectively reduce noise generation.

The inventors have also found that with the support member 6 provided so that the longitudinal direction of the support member 6 is parallel to the Y axis (rotation axis BX), the sticking-out portion 62 sticking out from the rib portion 61 in the X-axis direction can effectively reduce noise generation.

Since the sticking-out portion 62 sticks out from the rib portion 61 toward both sides in the transverse direction, noise generation can be reduced more effectively.

Second Embodiment

A second embodiment of the present invention will be described below. In the following descriptions, the same reference signs will be assigned to the same or substantially the same constituent elements as in the above-described embodiment, and descriptions thereof will be simplified or omitted.

Figure 6:
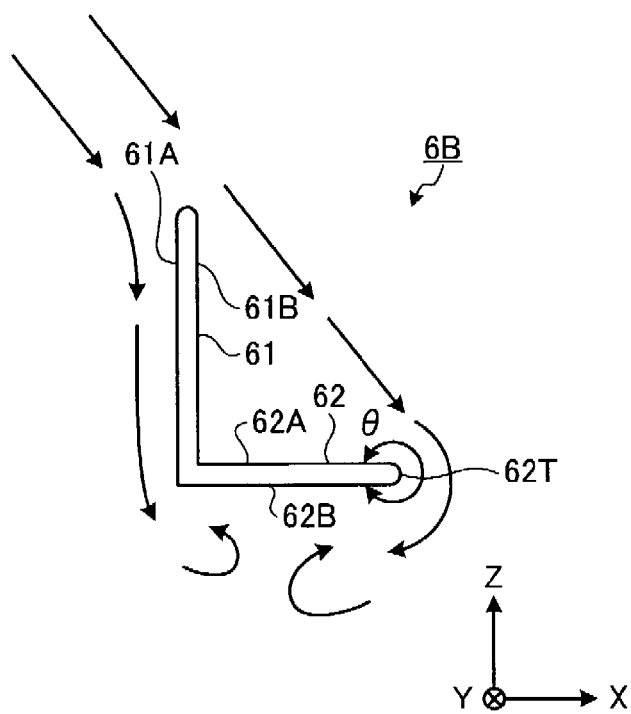
FIG. 6 is a cross-sectional view illustrating an example of a support member according to a second embodiment.

FIG. 6 is a cross-sectional view illustrating an example of a support member 6B according to the present embodiment. A sticking-out portion 62 sticks out from the lower end of the rib portion 61 in the +X direction but not in the −X direction.

With the support member 6B according to the present embodiment also, air colliding with the support member 6B flows into the blower 4 in a disturbed manner, resulting in reduction in noise generation.

Third Embodiment

Figure 7:
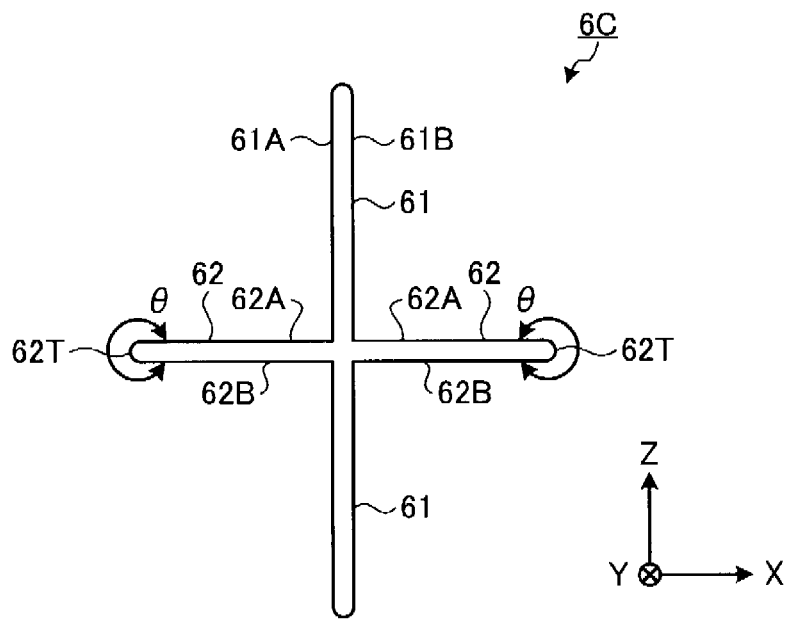
FIG. 7 is a cross-sectional view illustrating an example of a support member according to a third embodiment.

A third embodiment of the present invention will be described below. FIG. 7 is a cross-sectional view illustrating an example of a support member 6C according to the present embodiment. A sticking-out portion 62 sticks out from the central portion in the Z-axis direction of the rib portion 61 in the X-axis direction. In the example illustrated in FIG. 7, the sticking-out portion 62 sticks out from the central portion of the rib portion 61 toward both sides in the transverse direction.

With the support member 6C according to the present embodiment also, air colliding with the support member 6C flows into the blower 4 in a disturbed manner, resulting in reduction in noise generation.

Fourth Embodiment

Figure 8:
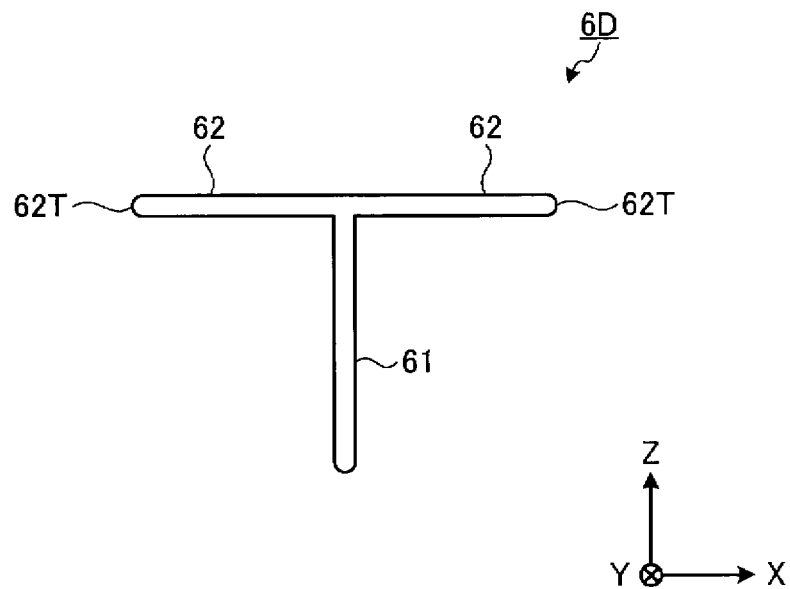
FIG. 8 is a cross-sectional view illustrating an example of a support member according to a fourth embodiment.

A fourth embodiment of the present invention will be described below. FIG. 8 is a cross-sectional view illustrating an example of a support member 6D according to the present embodiment. A sticking-out portion 62 sticks out from the upper end of the rib portion 61 in the X-axis direction. In the example illustrated in FIG. 8, the sticking-out portion 62 sticks out from the upper end of the rib portion 61 toward both sides in the transverse direction.

With the support member 6D according to the present embodiment also, air colliding with the support member 6D flows into the blower 4 in a disturbed manner, resulting in reduction in noise generation.

Fifth Embodiment

Figure 9:
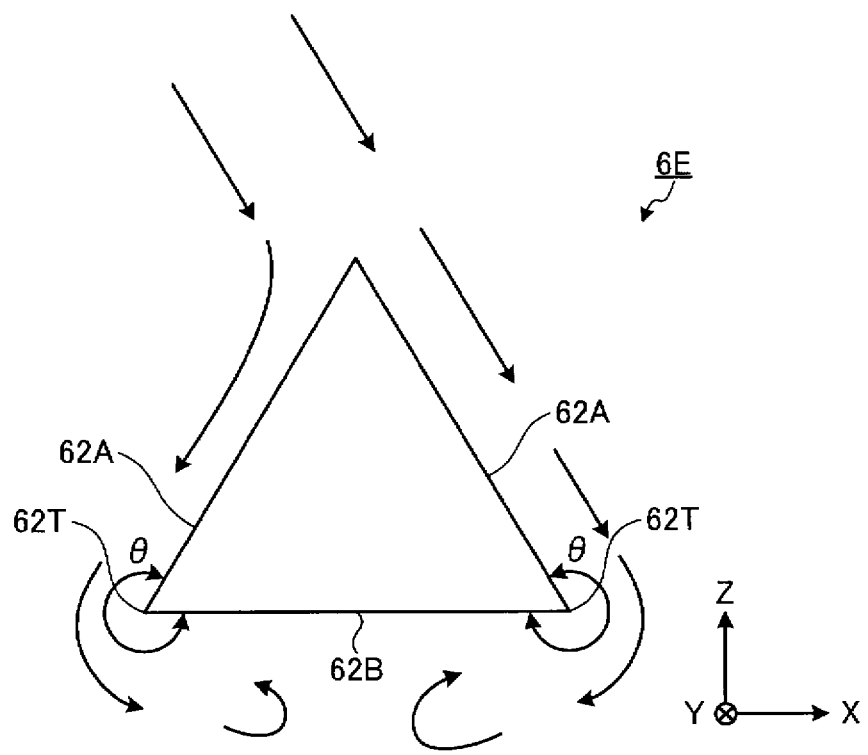
FIG. 9 is a cross-sectional view illustrating an example of a support member according to a fifth embodiment.

A fifth embodiment of the present invention will be described below. FIG. 9 is a cross-sectional view illustrating an example of a support member 6E according to the present embodiment. In the present embodiment, the support member 6E has a cross section orthogonal to the longitudinal direction (Y-axis direction) having a triangular shape. The support member 6E includes upper surfaces 62A that face the filter section 5 side and with which air collides and a lower surface 62B that faces in the direction of the blower 4 (−Z direction). The angle θ formed between each of the upper surfaces 62A and the lower surface 62B is, for example, 300°. That is, a corner, defined by the upper surface 62A and the lower surface 62B, of the support member 6E is pointed (acute).

In this way, the angle θ formed between the upper surface 62A and the lower surface 62B may be smaller than 360°. Note that the angle θ is preferably greater than 270° to effectively reduce noise generation by air colliding with the support member 6E, causing the flow of air to be disturbed.

Sixth Embodiment

Figure 10:
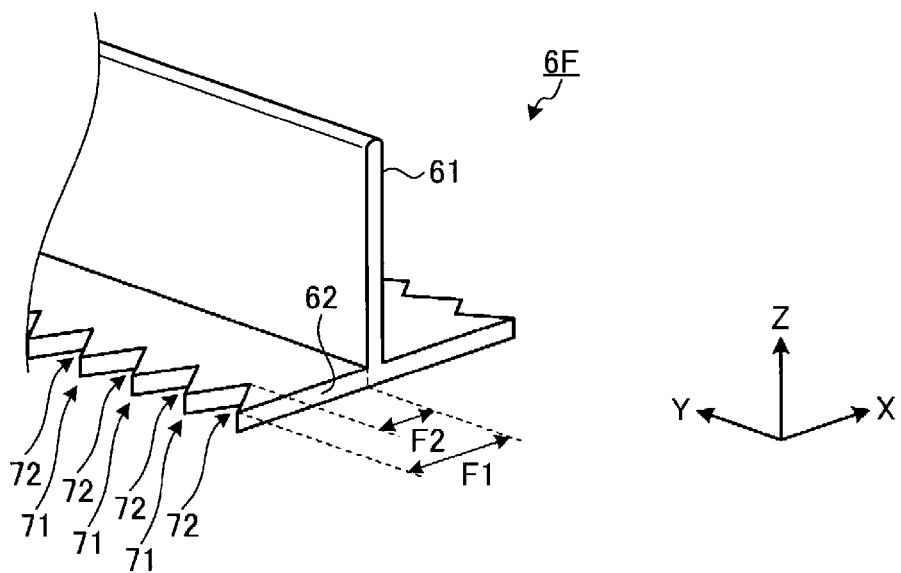
FIG. 10 is a perspective view illustrating an example of a support member according to a sixth embodiment.

A sixth embodiment of the present invention will be described below. FIG. 10 is a partial perspective view illustrating a support member 6F according to the present embodiment.

In the present embodiment, a sticking-out portion 62 includes first portions 71 of which a sticking-out amount from the rib portion 61 is a first dimension F1 and second portions 72 of which a sticking-out amount is a second dimension F2 different from the first dimension F1. The first portions 71 and the second portion 72 are disposed alternately in the longitudinal direction (Y-axis direction). In the example illustrated in FIG. 10, the first dimension F1 is greater than the second dimension F2. The first portions 71 and the second portions 72 disposed alternately in the longitudinal direction provide recesses and projections at the leading ends of the sticking-out portion 62 in the transverse direction (X-axis direction). The recesses and projections have regular intervals. Note that intervals of the recesses and projections refer to distances between adjacent projections or distances between adjacent recesses in the longitudinal direction.

In the example illustrated in FIG. 10, the projections in the recesses and projections have pointed leading ends.

The inventors have found that the recesses and projections provided at the leading ends of the sticking-out portion 62 can reduce noise generation more effectively. It is assumed that noise generation can be reduced because the recesses and projections provided at the leading ends of the sticking-out portion 62 further disturb the flow of gas.

Figure 11:
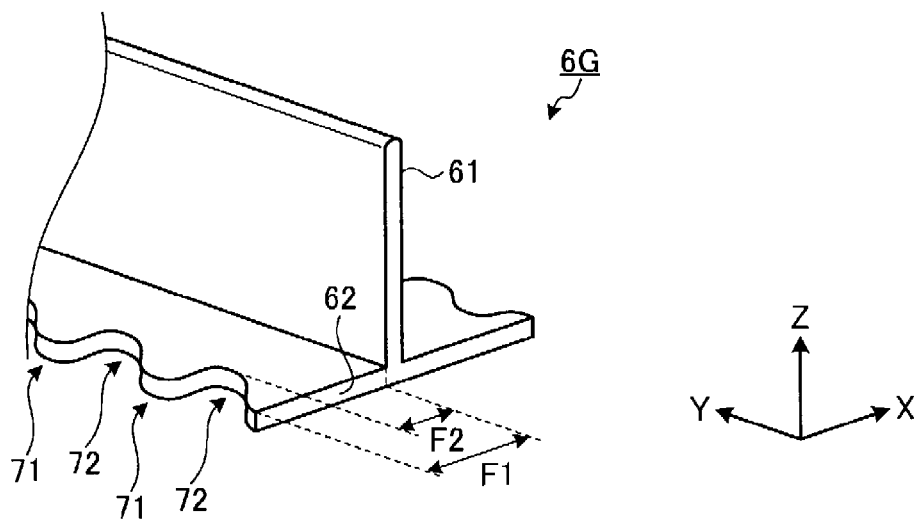
FIG. 11 is a perspective view illustrating an example of a support member according to the sixth embodiment.

Note that the projections in the recesses and projections may have rounded leading ends, like a support member 6G illustrated in FIG. 11.

Seventh Embodiment

Figure 12:
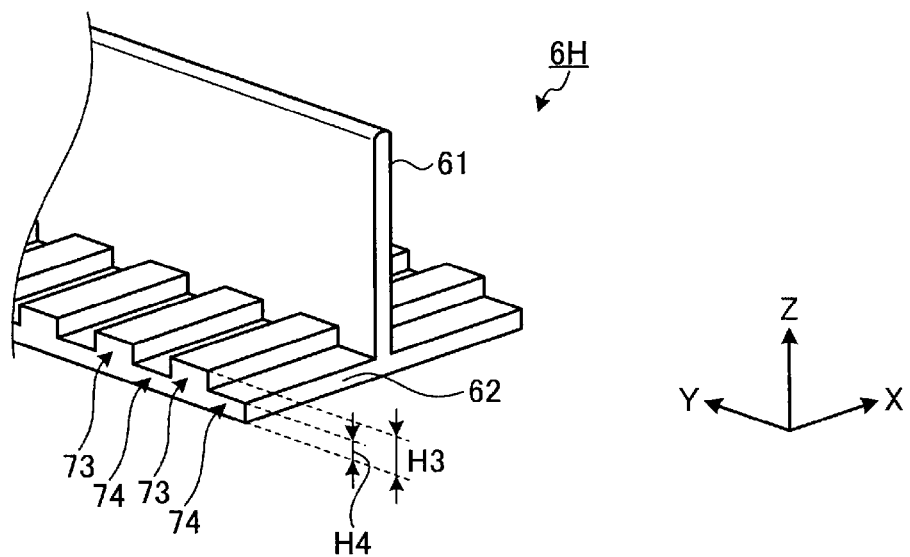
FIG. 12 is a perspective view illustrating an example of a support member according to a seventh embodiment.

A seventh embodiment of the present invention will be described below. FIG. 12 is a partial perspective view illustrating a support member 6H according to the present embodiment.

In the present embodiment, a sticking-out portion 62 includes third portions 73 of which a dimension in the Z-axis direction is a third dimension H3 and fourth portions 74 of which a dimension is a fourth dimension H4 different from the third dimension H3. The third portions 73 and the fourth portions 74 are disposed alternately in the longitudinal direction (Y-axis direction). In the example illustrated in FIG. 12, the third dimension H3 is greater than the fourth dimension H4. The third portions 73 and the fourth portions 74 disposed alternately in the longitudinal direction provide recesses and projections on the upper surface of the sticking-out portion 62. The recesses and projections have regular intervals.

The inventors have found that the recesses and projections provided on the upper surface of the sticking-out portion 62 can also effectively reduce noise generation. It is also assumed that noise generation can be reduced because the recesses and projections provided on the upper surface of the sticking-out portion 62 further disturb the flow of gas.

Note that the recesses and projections may be provided on the lower surface, facing the blower 4, of the support member 6H.

Eighth Embodiment

Figure 13:
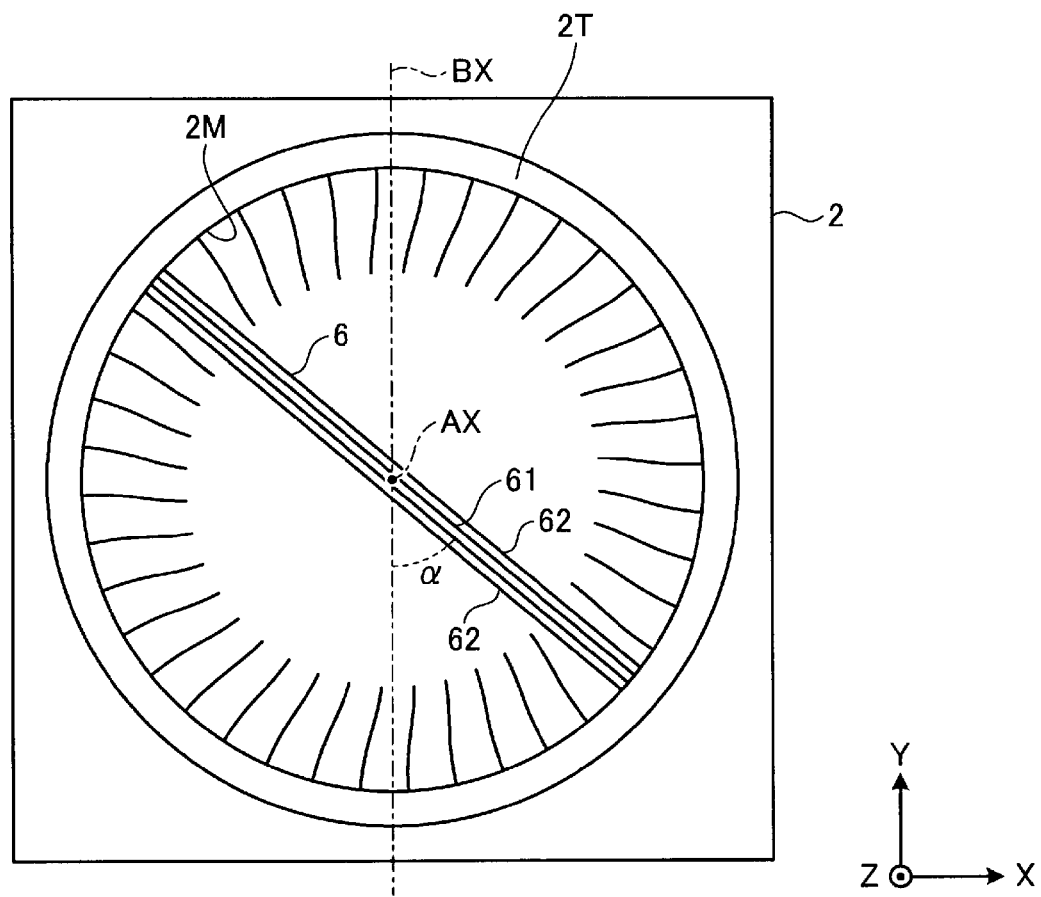
FIG. 13 is a top view of a housing according to an eighth embodiment.

An eighth embodiment of the present invention will be described below. FIG. 13 is a top view of a housing 2 according to the present embodiment.

As described with reference to FIG. 2 and the like, in each of the above-described embodiments, the longitudinal direction of the support member 6 is parallel to the rotation axis BX (Y axis). As illustrated in FIG. 13, the longitudinal direction of the support member 6 may be inclined relative to the rotation axis BX in the XY plane. Note that an angle α formed between the longitudinal direction of the support member 6 and the rotation axis BX in the XY plane is preferably 45° or smaller and more preferably 30° or smaller.

Even in a case where the longitudinal direction of the support member 6 is not parallel to the rotation axis BX (Y axis), and in a case where air taken in from the gas inlet 7 flows around the support member 6 into the blower 4, noise generation can be reduced with an angle α of 45° or smaller.

REFERENCE SIGNS LIST

1 Air conditioning device for vehicle
2 Housing
2M Opening
2T Upper surface
3 Inside/outside air switching box
4 Blower
5 Filter section 5F Filter
6 Support member
6B, 6C, 6D, 6E, 6F, 6G, 6H Support member
7 Gas inlet
7A Outside air inlet
7B Inside air inlet
8 Damper
9 Fan
10 Motor
61 Rib portion
62 Sticking-out portion
71 First portion
72 Second portion
73 Third portion
74 Fourth portion
AX Rotation axis
BX Rotation axis

The invention claimed is:

1. An air conditioning device for a vehicle, comprising:
a housing comprising an opening;
a blower comprising a fan accommodated in the housing, the fan rotating about a rotation axis parallel to a first axis;
a filter section disposed between a gas inlet and the opening, gas taken in from the gas inlet and flowing into the opening passing through the filter section; and
a support member disposed between the blower and the filter section located at least partially at the opening, the support member supporting the filter section;
the support member comprising a rib portion extending in a longitudinal direction in a predetermined plane orthogonal to the first axis and a sticking-out portion sticking out from the rib portion in a transverse direction in the predetermined plane orthogonal to the longitudinal direction; and
conditions below are satisfied:

$1\% \leq t/D \leq 5\%$, and $5\% \leq T/D \leq 15\%$, where t is a sticking-out amount of the sticking-out portion from the rib portion, D is a dimension of the opening, and T is a dimension of the sticking-out portion in the transverse direction of the support member,
wherein an upper surface of the sticking-out portion facing a lower surface of the filter section and a lower-most surface of the filter section define a gap therebetween.

2. The air conditioning device for a vehicle according to claim 1, wherein the support member is affixed to the housing to be located at the center of the opening.

3. The air conditioning device for a vehicle according to claim 2, wherein:
the air conditioning device for a vehicle comprises a damper capable of rotating about a rotation axis parallel to a second axis in the predetermined plane, the damper opening and closing the gas inlet;
the rotation axis of the fan is orthogonal to the rotation axis of the damper; and
the gas inlet is arranged away from the rotation axis of the damper in a direction parallel to a third axis in the predetermined plane orthogonal to the second axis.

4. The air conditioning device for a vehicle according to claim 3, wherein the longitudinal direction is parallel to the second axis.

5. The air conditioning device for a vehicle according to claim 1, wherein the sticking-out portion sticks out from the rib portion toward both sides in the transverse direction.

6. The air conditioning device for a vehicle according to claim 1, wherein:
the sticking-out portion comprises first portions and second portions, a sticking-out amount of the first portions from the rib portion being a first dimension, a sticking-out amount of the second portions from the rib portion being a second dimension different from the first dimension; and
the first portions and the second portions are disposed alternately in the longitudinal direction.

7. The air conditioning device for a vehicle according to claim 1, wherein:
the sticking-out portion comprises third portions and fourth portions, a dimension of the third portions in a direction parallel to the first axis being a third dimension, a dimension of the fourth portions in the direction parallel to the first axis being a fourth dimension different from the third dimension; and
the third portions and the fourth portions are disposed alternately in the longitudinal direction.

8. The air conditioning device for a vehicle according to claim 2, wherein the sticking-out portion sticks out from the rib portion toward both sides in the transverse direction.

9. The air conditioning device for a vehicle according to claim 3, wherein the sticking-out portion sticks out from the rib portion toward both sides in the transverse direction.

10. The air conditioning device for a vehicle according to claim 4, wherein the sticking-out portion sticks out from the rib portion toward both sides in the transverse direction.

11. The air conditioning device for a vehicle according to claim 2, wherein:
the sticking-out portion comprises first portions and second portions, a sticking-out amount of the first portions from the rib portion being a first dimension, a sticking-out amount of the second portions from the rib portion being a second dimension different from the first dimension; and
the first portions and the second portions are disposed alternately in the longitudinal direction.

12. The air conditioning device for a vehicle according to claim 3, wherein:
the sticking-out portion comprises first portions and second portions, a sticking-out amount of the first portions from the rib portion being a first dimension, a sticking-out amount of the second portions from the rib portion being a second dimension different from the first dimension; and
the first portions and the second portions are disposed alternately in the longitudinal direction.

13. The air conditioning device for a vehicle according to claim 4, wherein:
the sticking-out portion comprises first portions and second portions, a sticking-out amount of the first portions from the rib portion being a first dimension, a sticking-out amount of the second portions from the rib portion being a second dimension different from the first dimension; and
the first portions and the second portions are disposed alternately in the longitudinal direction.

14. The air conditioning device for a vehicle according to claim 5, wherein:
the sticking-out portion comprises first portions and second portions, a sticking-out amount of the first portions from the rib portion being a first dimension, a sticking-out amount of the second portions from the rib portion being a second dimension different from the first dimension; and the first portions and the second portions are disposed alternately in the longitudinal direction.

15. The air conditioning device for a vehicle according to claim 2, wherein:

the sticking-out portion comprises third portions and fourth portions, a dimension of the third portions in a direction parallel to the first axis being a third dimension, a dimension of the fourth portions in the direction parallel to the first axis being a fourth dimension different from the third dimension; and the third portions and the fourth portions are disposed alternately in the longitudinal direction.

16. The air conditioning device for a vehicle according to claim 3, wherein:

the sticking-out portion comprises third portions and fourth portions, a dimension of the third portions in a direction parallel to the first axis being a third dimension, a dimension of the fourth portions in the direction parallel to the first axis being a fourth dimension different from the third dimension; and the third portions and the fourth portions are disposed alternately in the longitudinal direction.

17. The air conditioning device for a vehicle according to claim 4, wherein:

the sticking-out portion comprises third portions and fourth portions, a dimension of the third portions in a direction parallel to the first axis being a third dimension, a dimension of the fourth portions in the direction parallel to the first axis being a fourth dimension different from the third dimension; and the third portions and the fourth portions are disposed alternately in the longitudinal direction.

18. The air conditioning device for a vehicle according to claim 5, wherein:

the sticking-out portion comprises third portions and fourth portions, a dimension of the third portions in a direction parallel to the first axis being a third dimension, a dimension of the fourth portions in the direction parallel to the first axis being a fourth dimension different from the third dimension; and the third portions and the fourth portions are disposed alternately in the longitudinal direction.

* * * * *